Aug. 9, 1966    M. E. FUENTEVILLA    3,264,756
DRYING TRAY
Filed June 1, 1964
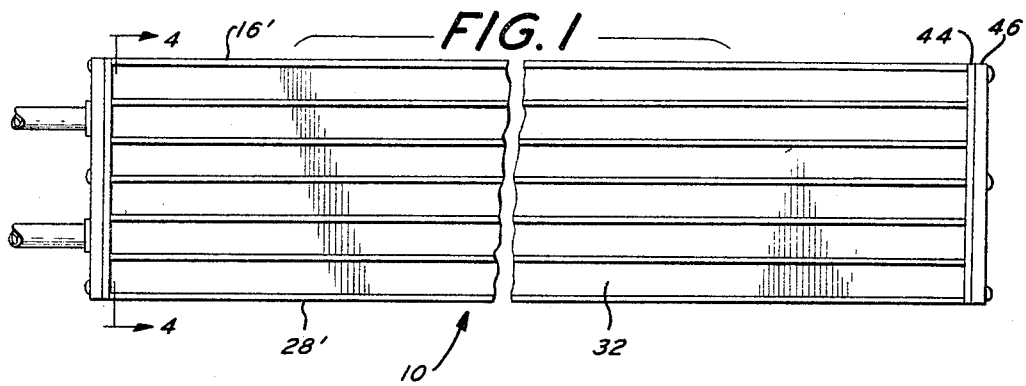
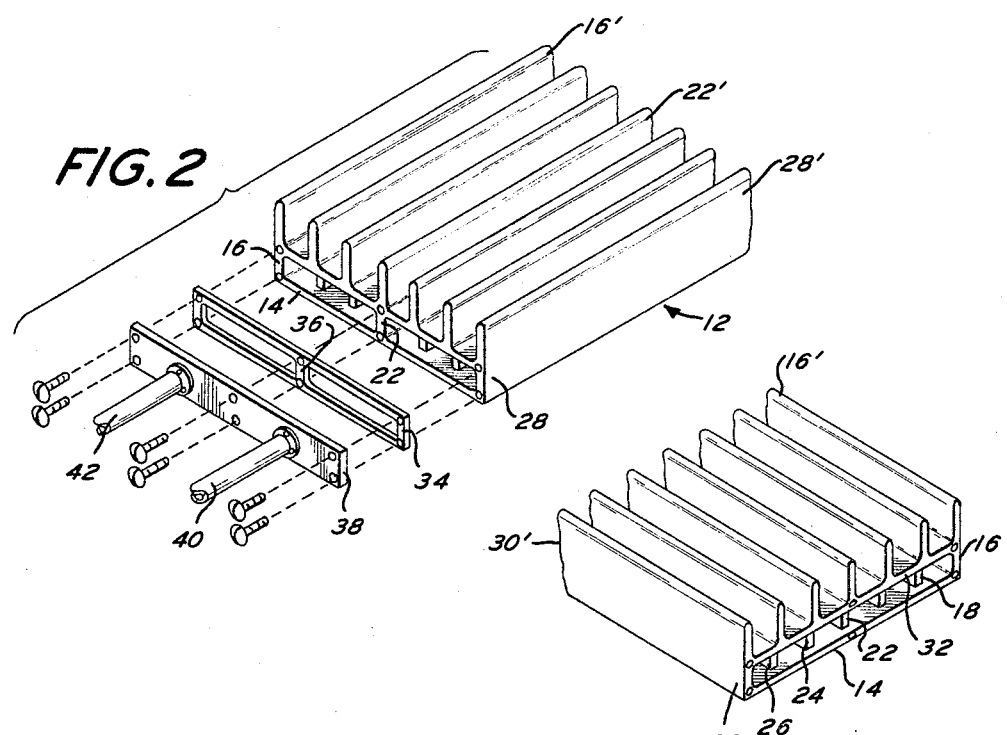
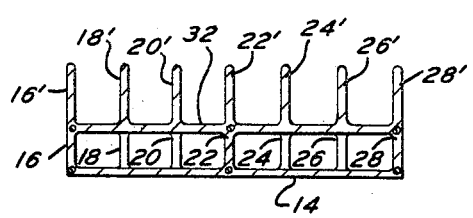
INVENTOR
MANUEL E. FUENTEVILLA
BY
ATTORNEYS.

United States Patent Office 3,264,756
Patented August 9, 1966

3,264,756
DRYING TRAY
Manuel E. Fuentevilla, Haddonfield, N.J., assignor to Pennsalt Chemicals Corporation, Philadelphia, Pa., a corporation of Pennsylvania
Filed June 1, 1964, Ser. No. 371,622
5 Claims. (Cl. 34—237)

This application is a continuation-in-part of copending application Serial No. 286,078 filed on June 6, 1963, and entitled, Drying Tray.

This invention relates to a drying tray, and more particularly, to a tray adapted for use in vacuum or freeze drier wherein products to be dried will be supported on and receive heat from the tray or move along the tray, and receive heat from the tray while moving therealong.

The drying tray of the present invention is made from a material having good thermal conductivity and good emissivity. Good thermal conductivity may be defined as thermal conductivity having a coefficient thereof which is greater than 100 at 70° F. Good emissivity may be defined as an emissivity greater than .9. The tray is preferably made from extruded aluminum which is then anodized or coated with a material such as urethane paint.

The tray of the present invention is to be of substantial length, such as up to twenty feet in length and is preferably a one-piece extrusion. The tray is structurally interrelated in a manner so as to have passages therein through which a heating medium may flow. The passages may be a straight flow-through arrangement wherein a heating medium enters the tray at one end and is discharged at the other end. In the illustrated embodiment, the passages may be orientated so that the heating medium flown down one side of the tray, enters a manifold chamber and then flows back down the other side of the tray, whereby the inlet and outlet conduits are at the same end of the tray.

It is an object of the present invention to provide a novel heating tray.

It is another object of the present invention to provide a onepiece extruded heating tray made from a material having good thermal conductivity and good emissivity.

It is another object of the present invention to provide a novel drying tray which can be manufactured inexpensively and which will enable a substantial amount of heat to be uniformly introduced into materials supported thereon for drying purposes.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a top plan view of the tray of the present invention.

FIGURE 2 is a partial exploded perspective view of the tray in FIGURE 1.

FIGURE 3 is a partial perspective view of the righthand end of the tray in FIGURE 1.

FIGURE 4 is a sectional view taken along the line 4—4 in FIGURE 1.

Referring to the drawing in detail, wherein like numerals indicate like elements, there is shown in FIGURE 1 a drying tray designated generally as 10.

The tray 10 includes a one piece extruded body 12 made from a material having good thermal conductivity and good emissivity. The tray body 12 is preferably a one piece extrusion of aluminum which has a thermal conductivity greater than 100 at 70° F. and an emissivity greater than .9. The tray body 12 may be annodized or provided with a coating such as urethane paint or the like.

The body 12 includes a bottom wall 14 having a plurality of spaced parallel upstanding ribs 16, 18, 20, 22, 24, 26 and 28 integral therewith. The upper end of the ribs 16–28 are integral with an article supporting wall 32. Wall 32 is parallel to wall 14.

Wall 32 is provided with a plurality of integral upstanding parallel ribs 16′, 18′, 20′, 22′, 24′, 26′ and 28′. Rib 16′ is directly above rib 16, rib 18′ is directly above rib 18, etc. However, this relationship between the position of the ribs may be varied as desired. The ribs 16′–28′ are preferably higher than the ribs 16–28.

As will be evidenced from FIGURES 2 and 4, the lefthand end of the ribs 18, 20, 24 and 26 have been machined so as to be shorter in length than the ribs 16 and 28. As will be apparent from FIGURE 3, the righthand end of the ribs 18, 20, 22, 24 and 26 have been machined so that these ribs are shorter in length than the ribs 16 and 28.

A gasket 34 is provided for the lefthand end of the tray 10. Gasket 34 corresponds generally to the configuration defined by walls 14 and 32, and ribs 16 and 28. Gasket 34 is provided with two elongated apertures separated by a web 36. Web 36 is positioned so as to overlie rib 22 when the ends of the gasket 34 overlie the ribs 16 and 28.

An end plate 38 is provided for the lefthand end of the body 12. End plate 38 corresponds to the peripheral configuration of the gasket 34. Conduits 40 and 42 extend from and are removably coupled to the end plate 38. Conduit 40 is generally in line with the channel between ribs 24 and 26. Conduit 42 is generally in line with the channel between ribs 18 and 20. Aligned holes are provided in the lefthand end of the body 12, in the gasket 34, and in the end plate 38 through which screws may extend to assemble the tray 10. A gasket 44 and end plate 46 are provided for the righthand end of the body 12. Gasket 44 is identical with gasket 34, but does not have a web corresponding to web 36. End plate 46 is identical with end plate 38, except that the end plate 46 does not have a provision for having conduits coupled thereto. The end plate 46 cooperates with the walls 14 and 32 as well as the ends of the ribs 18–26 to define a manifold chamber at the righthand end of the tray 10.

A pair of manifold chambers are provided at the lefthand end of the tray 10. The said pair of manifold chambers are on opposite sides of the rib 22 and are defined by the end plate 38, wall 14, wall 32, and the end faces of the ribs 18, 20, 24 and 26.

In use, the tray 10 will be disposed within an evacuated chamber. Articles to be vacuum dried or freeze dried will be placed on the tray 10. If desired, a means may be provided to cause the articles to move along the length of the tray 10. The articles to be dried, such as diced carrots, will be provided on the tray 10 between the ribs 16′–28′, will be supported from below by the wall 32, and will have a height slightly less than the height of the ribs 16′–28′. The tray 10 will be heated by passing a heating medium into one of the conduits 40 and 42 and permitting the heating medium to be discharged through the other conduit. For example, hot water may be pumped through conduit 40, through the channels between ribs 22 and 28, through the manifold at the righthand end of the tray 10, through the channels between the ribs 16 and 22, and then out through conduit 42.

The articles to be dried on tray 10 will be heated by conduction from below, namely by wall 32 as well as from the sides, namely by the ribs 16′–28′. If desired, the articles to be dried may also be subjected to radiant heat from above by any convenient means (not shown). Due to the good thermal conductivity and good emissivity of the body 12, the articles will be uniformly heated in a minimum amount of time.

As pointed out above, the heating medium may enter the tray 10 at one end and be discharged at the other end. In that case, each of the end plates would be provided with only a single conduit and the lefthand end of the rib 22 would be machined in the same manner as the ribs 18, 20, 24 and 26. In either its alternative embodiment or in the embodiment illustrated in the drawing, the righthand end of the body 12 will be as illustrated in FIGURE 3.

The present invention may be embodied in other specific forms without departing from the spirit or essential attributes thereof and, accordingly, reference should be made to the appended claims, rather than to the foregoing specification as indicating the scope of the invention.

I claim:

1. A tray for the drying of material under vacuum conditions while such material is moving along said tray comprising a flat extruded hollow body having boundary walls and a top surface, upright laterally spaced longitudinal ribs on said surface, said surface and said ribs being smooth in a lengthwise direction to promote smooth movement of material therealong to a drop off point for material, laterally spaced longitudinal partitions transecting the interior of said hollow body, end plate means secured to said body and comprising the end walls of the hollow body, said end plate means extending no higher than said top surface, at least some of said partitions stopping short of the end plate means to provide a path for transverse movement of fluid around the ends of said partitions, and conduit means secured to the tray and communicating with the interior of said body to provide an inlet and an outlet for a heat exchange fluid.

2. A tray for the drying of material as described in claim 1 wherein the conduit means comprise an inlet and an outlet tube for heat exchange fluid, both tubes being secured to one of said end plate means at laterally spaced locations thereon, all but one of said partitions stopping short of the end plate means, and the said one of said partitions being between said locations and extending to the said one of said end plate means.

3. A tray for the drying of material as described in claim 1 wherein the conduit means comprises an inlet and an outlet tube being secured to the end plate means on the opposite ends of the body respectively, and wherein none of said partitions extend to the end plate means.

4. A drying tray comprising a tray body having an article supporting wall and upright spaced ribs on said wall, means connected with said wall for defining fluid passage means below said wall, said means including partition means for defining an incoming fluid path and an outgoing fluid path, means including the ends of a plurality of spaced ribs having a length less than the entire length of said body and an end plate for defining a single manifold chamber at one end of said body, and means comprising another end plate which cooperates with said partition means and the other ends of said plurality of spaced ribs for defining at least two manifold chambers at the other end of said body.

5. A drying tray comprising a tray body having an article supporting wall and upright spaced ribs on said wall, a second wall spaced from said article supporting wall, spaced ribs on said second wall for defining fluid passage means below said article supporting wall, said spaced ribs on said second wall being parallel to said spaced ribs on said article supporting wall, a partition rib on second wall for defining an incoming fluid path and an outgoing fluid path, an end plate at each end of said body, the end plate at one end of said body cooperating with said body to define a single manifold chamber, the end plate at the other end of said body cooperating with said body to define a pair of manifold chambers, and said spaced ribs on said second wall having a length less than the entire length of said body.

References Cited by the Examiner

UNITED STATES PATENTS

| | | | |
|---|---|---|---|
| 999,147 | 7/1911 | Bonine | 165—176 |
| 1,774,860 | 9/1930 | Wendler et al. | 34—237 |
| 1,808,617 | 6/1931 | Thompson | 165—47 |
| 2,611,584 | 9/1952 | Labus | 165—176 X |

FREDERICK L. MATTESON, JR., *Primary Examiner.*

WILLIAM F. O'DEA, JOHN J. CAMBY, *Examiners.*

C. R. REMKE, *Assistant Examiner.*